Sept. 5, 1939. W. E. HILL ET AL Re. 21,197

TOOTH BRUSH AND PROCESS OF MAKING THE SAME

Original Filed April 7, 1933

INVENTORS
Warren E. Hill and
Clifford R. McArthur
By Dike, Calver & Gray
Attys.

Reissued Sept. 5, 1939 Re. 21,197

UNITED STATES PATENT OFFICE 21,197

TOOTH BRUSH AND PROCESS OF MAKING THE SAME

Warren E. Hill, Northampton, Mass., and Clifford L. McArthur, Birmingham, Mich., assignors to Pro-Phy-Lac-Tic Brush Company, Northampton, Mass., a corporation of Delaware Original No. 2,099,688, dated November 23, 1937, Serial No. 664,894, April 7, 1933. Application for reissue April 14, 1938, Serial No. 202,046

8 Claims. (Cl. 300—21)

Our invention relates to brushes, such for example, as tooth brushes and to a process of making such brushes.

One of the objects of our invention is to provide an antiseptic or self-sterilizing tooth brush. Another object of the invention is to provide a tooth brush of the foregoing character in which the bristles thereof are substantially impervious to moisture.

A further object of the invention is to provide an improved process by which tooth brushes having the aforesaid characteristics may be produced. Other objects and advantages of the invention will appear from the following description and appended claims.

The invention will be more clearly understood from the following description in conjunction with the accompanying drawing, in which.

Figure 1:
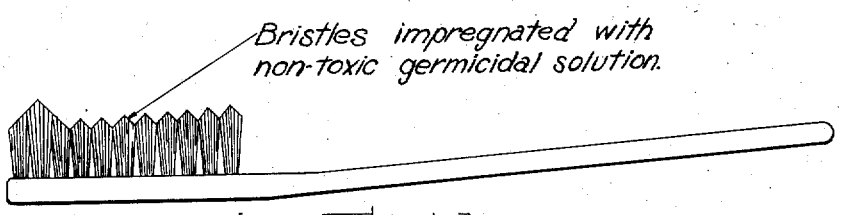
Fig. 1 is a longitudinal elevational view of a brush embodying the invention.
Figure 2:
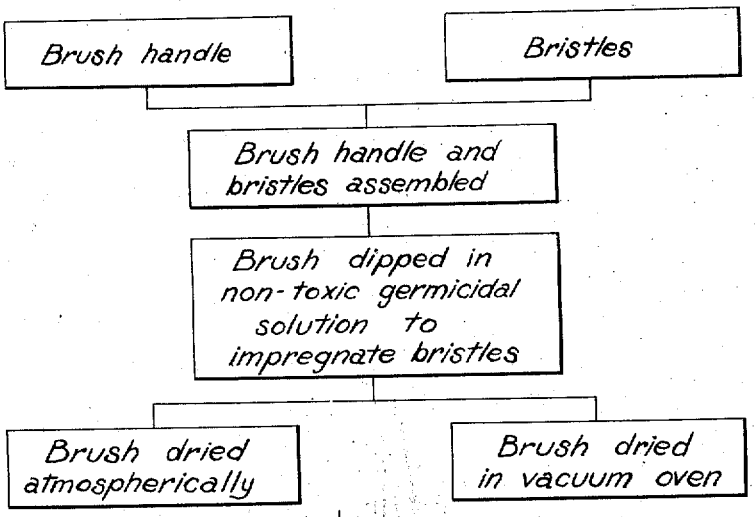
Fig. 2 is a diagrammatic view illustrating the steps of the method of treating the bristles after assembly with the brush handle.
Figure 3:
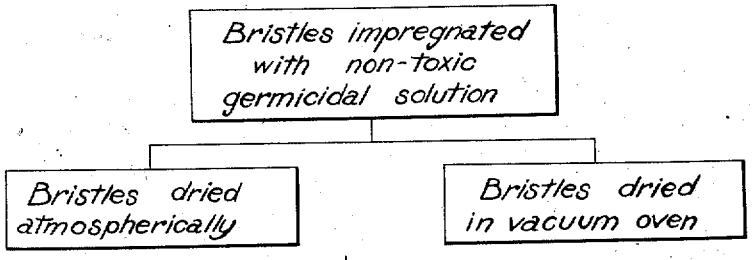
Fig. 3 is a diagrammatic view illustrating the steps in the method of treating the bristles before they have been assembled with the brush handle.

Before explaining in detail the present invention it is to be understood that the phraseology or terminology employed herein is for the purpose of description and not of limitation, and it is not intended to limit the invention claimed herein beyond the requirements of the prior art.

It is well known that bacteria, fungi, mold and other like organisms ordinarily become associated with the bristles and the bristle end of tooth brushes either through use when brushing the teeth or from the atmosphere and various articles with which the tooth brush may be associated or come in contact. Chiefly for reasons of both health and appearance, it has long been desired to produce a tooth brush which will inhibit or kill these organisms even after prolonged periods of use. It is, therefore, a purpose of our invention to provide such a brush.

In accordance with our invention the bristles, before being assembled with the brush, may be rendered antiseptic, or, if desired, the brush head with the bristles assembled therein may be immersed in an antiseptic solution to sterilize the bristles. In the latter case, the bristles in the completed brush may be immersed in the antiseptic solution, with little or no contact of said solution with the brush head.

We have found that our process can be carried out successfully by the use of any one of the following antiseptic solutions, all of which have been given very satisfactory results. In its broader aspects, the process of our invention contemplates immersing the head of the brush with the assembled bristles (or the bristles alone before their assembly with the brush) in a solution containing ingredients having antiseptic properties, for a period of time sufficient to allow an adequate amount of the antiseptic agent to penetrate into or become absorbed by the bristles, the length of time of the immersion depending upon the rate at which the solution penetrates the bristles, and also upon the strength of the antiseptic solution. Under certain circumstances, it may be desired to impregnate the bristles at pressures other than atmospheric. The impregnation may then be carried on at either reduced or increased pressure, or any combination of pressures whereby adequate impregnation, as herein described, is accomplished. The brush is then removed from the solution and dried, preferably, in a vacuum oven, at a temperature of approximately 125° F. for a sufficient period of time to remove the solvent of the solution, leaving the antiseptic agent closely associated with the bristles. The temperature within the oven should be kept at a degree which will not injure either the brush or the bristles. The length of time required for the drying operation depends upon the temperature maintained in the oven. It is, of course, possible to air-dry the brushes at normal temperatures and pressures but in this case a longer time is required to complete the drying operation.

We have discovered that a very satisfactory antiseptic solution for the foregoing purpose is one which contains a phenyl mercuric salt, such for example, as phenyl mercuric nitrate, and a solvent. Suitable solvents include water, and also certain organic compounds, including dioxane ($C_4H_8O_2$) and amyl acetate. A solution may be prepared using substantially saturated solutions of phenol mercuric nitrate in these solvents; such solutions will contain approximately 0.8 gram of antiseptic per liter of water, or approximately 3 to 5 grams of antiseptic per liter in the case of the other solvents mentioned. The proportions, however, may be varied to meet different conditions. It has been found that sometimes the brush bristles become slightly discolored during treatment. To counteract this action and produce a pure white bristle, it may be desirable to add to the solution a small amount of any desirable coloring agent. One such suitable agent is methylene blue. The coloring agent used must, of course, be one which will mix with the antiseptic solution and which is not objectionable for use on the tooth brush.

If it is desirable to produce an antiseptic tooth brush in which the bristles are impervious to moisture, then any suitable non-water-soluble material, such, for example, as certain waxes, waterproof cellulose-ester-base compositions, or the like, may be added to the solution. Waxes, such as paraffine, ceresin, carnauba, etc., are suitable for this purpose; waterproof compositions having as a base a cellulose ester or other suitable compound or derivative of cellulose may be used. The waterproofing material may be dissolved in a solvent, and added to the solution of antiseptic agent. The two solvents are preferably miscible, so that a single-phase liquid will result after the two solutions are mixed. Or, if desired, the two solvents may be mixed first; or a suitable single solvent may be used, and the antiseptic agent and the waterproofing material may each be added thereto. For such purposes, dioxane and toluol, for example, result in a good single-phase liquid, as the former dissolves the phenyl mercuric nitrate and the latter the water-proofing agent, and the two solvents are miscible. The waterproofing agent cooperates with the antiseptic to retard diffusion of the antiseptic dried upon the bristles when wetted for usage.

Other solvents than those mentioned may be used in preparing the phenyl mercuric nitrate solution. The solvent used should be chosen with reference to whether or not a waterproofing material is to be used, and to various obvious factors such as solubility, effect on color and quality of the bristles, etc. Ethyl alcohol, acetone, benzol, ethyl acetate and certain other acetates, etc. may be used alone or in admixture with each other or with the various solvents hereinbefore set forth. As one example of this, we have used successfully a solution of phenyl mercuric nitrate in dioxane wherein a suitable part of the dioxane has been replaced by acetone while the amount of salt dissolved remains substantially the same as though the solvent were entirely dioxane.

Antiseptic or germicidal solutions containing other ingredients may, of course, be used. Oxyquinoline sulfate, another effective germicide, may be used in place of the phenyl mercuric salts. The process is the same, except that the sulfate, being much more soluble in water than phenyl mercuric salts, is not ordinarily applied to the bristles in a saturated solution, but rather in a concentration of about 1 part of sulfate to between 100 and 1000 parts of solvent. The concentration used should be sufficient to impart the desired germicidal activity.

It may be desirable to use para-chlorothymol as the antiseptic agent. This agent is not water soluble and the solution must be prepared with another solvent, such for example, as ethyl alcohol.

It will be understood that when we refer to a solution we include, of course, any dispersions, emulsions, suspensions, etc., of the germicide and/or the waterproofing agent in any suitable fluid whereby the germicide and/or waterproofing agent may be brought into intimate association with the bristles. Moreover, it will be understood that the antiseptic used is nontoxic and it does not impart objectionable properties of color, taste or odor to the articles rendered antiseptic.

From the foregoing it will be seen that we have provided a new article of manufacture and a process for producing it in which the process consists, broadly, in immersing either the loose bristles before assembly with the brush, or the brush with the bristles assembled therein, in a solution containing a suitable antiseptic or germicide which renders the bristles antiseptic or self-sterilizing for a long period of time, approximating the useful life of the brush. The immersion may take place at any convenient time during the manufacturing process. The process contemplates further the use in such solution of a suitable non-water-soluble material which renders the bristles impervious to moisture.

The drying of the sterilized bristles, or the brush with the assembled bristles, may be performed in a vacuum oven at any suitable non-injurious temperature, and, if desired, at a reduced pressure; or they may be subjected to air drying.

We claim:

1. The hereindescribed process of making an antiseptic brush having bristles which are impervious to moisture, which comprises immersing the brush head and bristles in a solution containing phenyl mercuric nitrate, paraffin wax and toluol.

2. A process of making an antiseptic tooth brush having bristles which are impervious to moisture which comprises treating the bristles with a solution containing an antiseptic, a waterproofing agent and a solvent consisting of dioxane and toluol.

3. A process of making a self-sterilizing brush which comprises impregnating the bristles with a solution containing a waterproofing agent and an antiseptic.

4. A brush having the bristles thereof impregnated with an antiseptic and a waterproofing agent, the waterproofing agent being effective to retard diffusion of the antiseptic.

5. A process of making a self-sterilizing brush which comprises impregnating the bristles with a solution containing a waterproofing agent and a phenyl mercuric salt.

6. A process of making a self-sterilizing brush which comprises impregnating the bristles with a solution containing a waterproofing agent and oxyquinoline sulphate.

7. A process of making a self-sterilizing brush which comprises impregnating the bristles with a solution containing a waterproofing agent and parachlorothymol.

8. A brush having the bristles thereof provided with a waterproofing means and permeated with an antiseptic, said waterproofing means retarding diffusion of the antiseptic when the bristles are wetted in usage.

WARREN E. HILL.
CLIFFORD L. McARTHUR.